(12) United States Patent
Abuelsaad et al.

(10) Patent No.: US 9,275,227 B2
(45) Date of Patent: Mar. 1, 2016

(54) POLICY DRIVEN ADMINISTRATION OF MOBILE APPLICATIONS

(75) Inventors: Tamer E. Abuelsaad, Poughkeepsie, NY (US); William Bodin, Austin, TX (US); David Jaramillo, Lake Worth, NY (US); Nader M. Nassar, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 226 days.

(21) Appl. No.: 13/440,363

(22) Filed: Apr. 5, 2012

(65) Prior Publication Data

US 2013/0268667 A1 Oct. 10, 2013

(51) Int. Cl.
*G06F 15/173* (2006.01)
*G06F 15/16* (2006.01)
*G06F 21/57* (2013.01)

(52) U.S. Cl.
CPC ........................................ *G06F 21/57* (2013.01)

(58) Field of Classification Search
CPC ... H04L 63/1433; H04L 63/20; G06F 21/577; H04W 12/08; H04W 4/003
USPC .................................. 709/223–225, 227–232
See application file for complete search history.

(56) References Cited

U.S. PATENT DOCUMENTS

| | | | |
|---|---|---|---|
| 6,389,403 B1 | 5/2002 | Dorak, Jr. | |
| 6,584,569 B2 | 6/2003 | Resher et al. | |
| 6,701,521 B1 | 3/2004 | McLlroy et al. | |
| 7,237,265 B2* | 6/2007 | Reshef | G06F 21/554 709/203 |
| 8,365,290 B2* | 1/2013 | Young | G06F 21/564 726/22 |
| 8,464,335 B1* | 6/2013 | Sinha | G06F 21/51 713/153 |
| 8,495,700 B2* | 7/2013 | Shahbazi | H04L 63/20 380/247 |
| 8,495,746 B2* | 7/2013 | Fissel | H04L 63/1433 709/229 |
| 2002/0010855 A1* | 1/2002 | Reshef | G06F 21/554 713/164 |
| 2005/0038881 A1 | 2/2005 | Ben-Itzhak | |
| 2005/0138426 A1 | 6/2005 | Styslinger | |
| 2005/0188221 A1* | 8/2005 | Motsinger | G06F 21/55 726/5 |
| 2006/0106866 A1 | 5/2006 | Green | |
| 2006/0174115 A1 | 8/2006 | Rao et al. | |
| 2007/0233854 A1 | 10/2007 | Bukovec et al. | |
| 2010/0293616 A1* | 11/2010 | Young | G06F 21/564 726/25 |
| 2011/0047620 A1 | 2/2011 | Mahaffey et al. | |
| 2011/0154498 A1* | 6/2011 | Fissel | H04L 63/1433 726/25 |
| 2011/0167474 A1* | 7/2011 | Sinha | G06F 21/56 726/1 |

(Continued)

OTHER PUBLICATIONS

U.S. Appl. No. 13/562,938; Final Office Action, Date Filed: Jul. 31, 2012, Date Mailed Dec. 3, 2014; 16 pages.

(Continued)

*Primary Examiner* — Edward Kim
(74) *Attorney, Agent, or Firm* — Cantor Colburn LLP (57) ABSTRACT

Policy-driven administration of mobile applications includes receiving a policy defined by a client system. The policy is defined by rules configured for implementation by a scanner and a compliance definition indicative of a threshold acceptability value for output of the implementation of the scanner on a mobile application. The policy-driven administration also includes executing the scanner for the mobile application and identifying an association between a mobile device and the client system. The policy-driven administration of mobile applications further includes controlling access to the mobile application by the mobile device based on results of executing the scanner using the compliance definition.

9 Claims, 4 Drawing Sheets

(56) References Cited

U.S. PATENT DOCUMENTS

| | | |
|---|---|---|
| 2011/0225291 A1 | 9/2011 | Dobroth et al. |
| 2011/0250872 A1 | 10/2011 | Kim et al. |
| 2012/0036018 A1* | 2/2012 | Feliciano ............... G06Q 30/02 705/14.66 |
| 2012/0110174 A1* | 5/2012 | Wootton ............... G06F 21/564 709/224 |
| 2012/0131685 A1* | 5/2012 | Broch ................... G06F 21/554 726/30 |
| 2012/0240183 A1* | 9/2012 | Sinha ................... H04W 12/08 726/1 |
| 2013/0185292 A1* | 7/2013 | Li ..................... G06F 17/30522 707/723 |
| 2013/0219493 A1* | 8/2013 | Banzhof ............. H04L 63/1433 726/22 |
| 2013/0227636 A1* | 8/2013 | Bettini ................. H04W 4/001 726/1 |

OTHER PUBLICATIONS

U.S. Appl. No. 13/562,938; Non-Final Office Action; Date Filed: Jul. 31, 2012; Date Mailed: Apr. 7, 2014, 18 pages.

\* cited by examiner

APP NAME          DOCUMENT WRITER ⌐402
APP ID            1234567890 ⌐404
APP VERSION       1.2 ⌐406

APP SCAN RESULTS

SCANNER NAME      SECURE-COMMUNICATION
SCANNER ID        ABCXYZW123
SCANNER URI       APPSTORE/SCANNERS/SECURE-COMMUNICATION
SCAN RESULT       PASS

SCANNER NAME      INJECTION-ATTACK
SCANNER ID        ABCXYY567
SCANNER URI       APPSTORE/SCANNERS/INJECTION-ATTACK
SCAN RESULT       7.0

SCANNER NAME      XSS-ATTACK
SCANNER ID        ABCXYY897
SCANNER URI       APPSTORE/SCANNERS/XSS-ATTACK
SCAN RESULT       FAIL 408  410  412
        414

FIG. 4

POLICY DRIVEN ADMINISTRATION OF MOBILE APPLICATIONS

BACKGROUND

The present invention relates to mobile applications and, more specifically, to policy-driven administration of mobile applications.

Organizations that supply its members with devices or allow devices into the organization space are faced with the challenges of malicious applications that may infect the devices or worse, gain unauthorized access to the organizations' data. Many known applications collect data from, or through, these devices and use the data in ways that would not be acceptable to a given organization's policies. For example, some applications may collect data about a device user, or use aspects of the device to gain privileged information about the organization.

SUMMARY

According to another embodiment of the present invention, a system for implementing scanning services is provided. The system includes a computer processor and logic executable by the computer processor. The logic is configured to implement a method. The method includes receiving, at a computer processor, a policy defined by a client system. The policy is defined by rules configured for implementation by a scanner and a compliance definition indicative of a threshold acceptability value for output of the implementation of the scanner on a mobile application. The method also includes executing, via the computer processor, the scanner for the mobile application. The method also includes identifying an association between a mobile device and the client system, and controlling access to the mobile application by the mobile device based on results of executing the scanner using the compliance definition.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to policy-driven application scanning, which provides the ability for entities, such as organizations or enterprises to establish customized policies for use in scanning various mobile applications, such that end users associated with these entities are able to download or access only those mobile applications that comply with the policies subject to the scanning.

Figure 1:
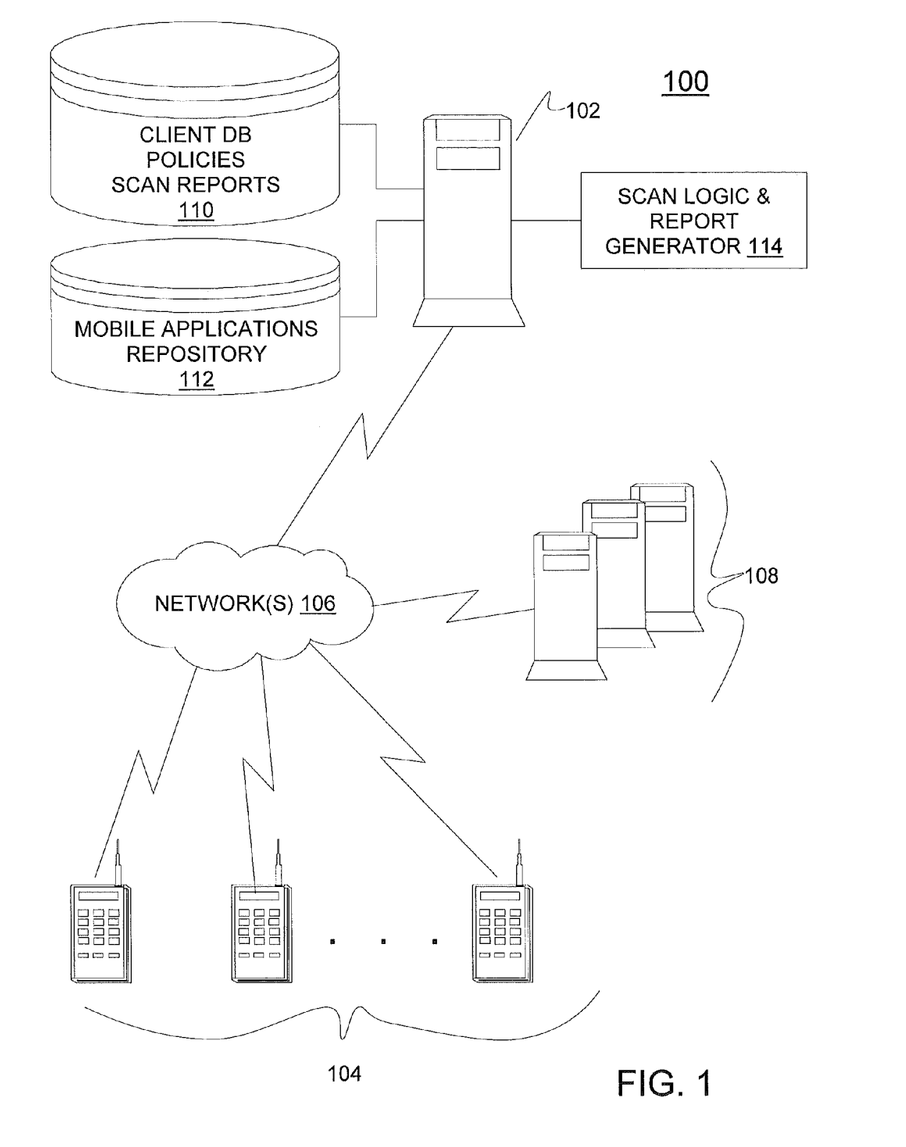
FIG. 1 depicts a block diagram of a system upon which policy-driven scanning of mobile applications may be implemented according to an embodiment.

Turning now to FIG. 1, a system upon which policy-driven application scanning services (also referred to herein as "scanning services") may be implemented will now be described. The system 100 of FIG. 1 depicts a host system computer 102 and mobile devices 104 in communication with one or more networks 106.

The host system computer 102 may be implemented as one or more high-speed computer processing devices, such as one or more mainframe computers capable of handling a high volume of computing activities conducted by end users of the exemplary scanning services. The host system computer 102 executes scan logic and report generator 114 for implementing the scanning services described herein. Alternatively, a portion of the scan logic and report generator 114 may reside on a user system, such as one or more of mobile devices 104, or on one or more client systems (e.g., client systems 108). The scan logic and report generator 114 may also include an interface that is presented to client systems 108 for creating policies as described herein.

The host system computer 102 may be implemented by a mobile application provider, such as an online or virtual 'app store' that receives a variety of mobile applications from a multitude of different application developers, and stores the mobile applications for download by end user devices, typically for a small fee. The mobile applications are stored by the host system computer 102 in a storage device 112, referred to as a mobile applications repository, which is communicatively coupled to the host system computer 102.

A storage device 110 stores a variety of data used by the host system computer 102 in implementing the exemplary scanning services. As shown in FIG. 1, the storage device 110 stores a client database, policies, and scan reports, as will be described further herein. In an embodiment, a client system 108 creates a policy that includes a client system-generated application scan. The application scan includes executable code for implementing the policy with respect to one or more mobile applications. In an embodiment, the policy created by the client system includes an application scan that is created by the host system computer 102 or a third-party entity. In a further embodiment, the policy may be generated by machine, e.g., using a Web Service or Remote Procedure Call (RPC) to configure the policy details. The application scan is also referred to herein as a "scanner."

The storage device 110 may also store existing application scans developed by the host system computer 102. Further, the storage device 110 may store links or locations (e.g., URIs) of application scans developed by third-party entities (not shown). The locations of these application scans may be retrieved for use in accessing a particular application scan when needed. It is understood that the storage devices 110 and 112 may be implemented using memory contained in the host system computer 102 or may each be a separate physical device, as illustrated in FIG. 1. The storage devices 110 and 112 may be logically addressable as consolidated data sources across a distributed environment that includes a network (e.g., network(s) 106).

The host system computer 102 operates as a database server and coordinates access to application data including data stored on the storage devices 110 and 112. The host system computer 102 may be implemented using one or more servers operating in response to a computer program stored in a storage medium accessible by the server. The host system computer 102 may operate as a network server (e.g., a web server) to communicate with the mobile devices 104 and other network entities, such as client systems 108.

As shown in FIG. 1, mobile devices 104 are provided. Mobile devices 104 refer to portable, wireless communication devices, such as smart phones, personal digital assistants, and tablet PCs. The end users of mobile devices 104 may form a community or subset of devices for which one or more common policies are established and enforced by the host system computer 102. In an embodiment, mobile devices 104 are implemented by end users of an entity, such as an organization or enterprise. For example, the mobile devices 104 may be provided to the end users by their employers for performing work-related tasks. The mobile devices 104 may each execute a web browser for accessing network entities, such as the host system computer 102. In one embodiment, the mobile devices 104 access a web site of the host system computer 102 for browsing and downloading mobile applications residing in the storage device 112.

In an embodiment, the host system computer 102 is communicatively coupled to the client systems 108 via the network(s) 106. The client systems 108 may be implemented as high-speed computer processing devices, such as mainframe computers capable of processing communications and transactions occurring between them and the host system computer 102. Each of the client systems 108 may be implemented by a registered client of the exemplary scanning services. A client refers to an entity, such as an organization or enterprise that subscribes to the scanning services for use in controlling access to various mobile applications by designated mobile devices associated with the client. In an embodiment, the client may be an employer who provides mobile devices to its employees for performing work-related tasks.

To facilitate the longevity and operational security of these mobile devices, the entity may desire certain restrictions be placed on the devices with respect to the various mobile applications otherwise available for download by the devices. The exemplary scanning services provide the client systems 108 with the ability to define policies that are translated into machine-readable code, which code is used to scan mobile applications prior to their dissemination to end users. In an embodiment, the client systems 108 register with the host system computer 102 for these scanning services and create customized policies, which are stored in the storage device 110, along with relevant client information, such as client identifiers, etc. that help to link or correlate the customized policies with associated clients. The scan logic and report generator 114 converts the policies to machine-readable code, which is used to scan mobile applications from the storage device 112 and generate scan reports that contain the results of the scanning, as described further herein.

The network(s) 106 may be any type of known networks including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art, e.g., using cellular, satellite, and/or terrestrial network technologies.

As described above, the exemplary policy-driven application scanning services provide the ability for entities, such as organizations or enterprises to establish customized policies for use in scanning various mobile applications, such that end user devices associated with these entities are able to download or access only those mobile applications that comply with the policies subject to the scanning.

Figure 2:
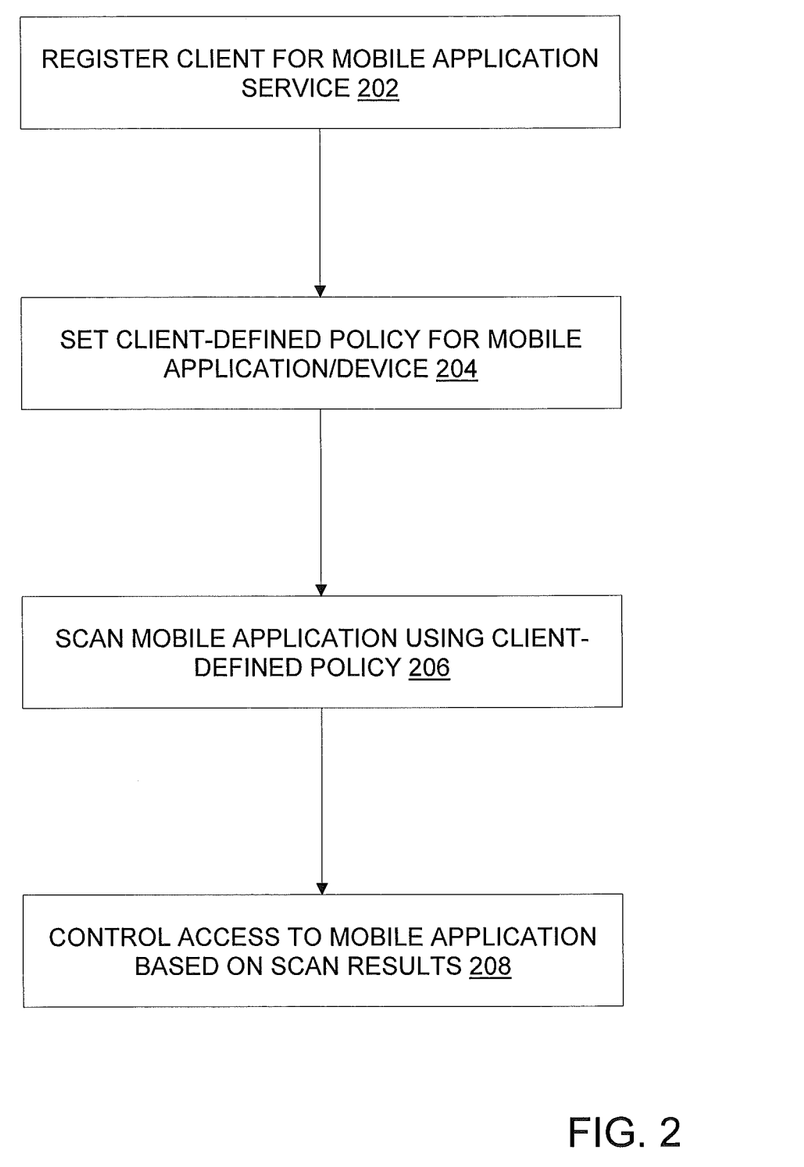
FIG. 2 depicts a flow diagram of a process for providing policy-driven scanning of mobile applications according to an embodiment.

Turning now to FIG. 2, a process for implementing the scanning services will now be described in an exemplary embodiment. The processes described in FIG. 2 assume that the host system computer 102 has received and stored a plurality of mobile applications created by various application developers and published to the host system computer 102. The host system computer 102 provides end users, such as mobile devices 104 with the ability to download selected mobile applications from the repository of storage device 112 based on customized policies established by client systems 108 associated with the mobile devices 104.

At step 202, one of the client systems 108 registers with the host system computer 102 for receiving the scanning services. The host system computer 102 may collect and store client information during the registration process, and the collected information is organized in a client database stored in storage device 110. As shown in tables 300 of FIG. 3, for example, a table 302 lists each of the clients registered for the scanning services. The host system computer 102 may uniquely identify the client using an assigned client identifier 306, e.g., the name of the client organization or other means of identification. In one embodiment, the host system computer 102 may store in table 302 identifiers (not shown) of a set of mobile devices 104 associated with the client systems 108. For example, a client system 108 which provides the use of employer mobile devices to its employees may provide the host system computer 102 with identifiers of these mobile devices as part of the registration process.

At step 204, the host system computer 102 receives information from the client system 108 concerning one or more policies. In an embodiment, the client system 108 may access a website of the host system computer 102 and the scan logic and report generator 114 guides the client system 108 through a policy authoring process, e.g., via an interface of the scan logic and report generator 114 provided by the host system computer 102. The policy may be custom-defined by the client system 108 by entering instructions or rules and criteria (e.g., through the interface) for searching a mobile application in an effort to determine or detect security issues, vulnerabilities, performance issues, or any other criteria of interest to the client system 108. For example, the client system 108 may define criteria to include screening mobile applications to determine whether they use graphics libraries.

In addition, the client system 108 is guided through a process for defining expectations for scan results. For example, a policy may be defined such that the existence of a security threat resulting from a particular scan could result in an automatic 'fail,' which causes the host system computer 102 to decline a mobile device's 104 request to download the mobile application. Alternatively, a policy could be defined where a score value, e.g., a threshold percentage or number of incidences of a specified 'violation' or occurrence would cause the host system computer 102 to decline a mobile device's 104 request to download the mobile application. In a further example, a policy could be defined where a specified scan result would cause the host system computer 102 to allow download of a mobile application, but with limited features (e.g., view/read only access). The expectations for scan results determined to be acceptable by the client system 108 is referred to herein as a threshold acceptability value (e.g., a score of 7 or a 'pass' indicator).

A sample XML-based policy including application scan definitions established by a client system 108 is shown below by way of non-limiting example:

```xml
<xml>
    <organization-id>ACME-XF-33456-1</organization-id>
    <appscan name"secure-communication">
        <scanner-uri>appstore/scanners/secure-
communication</scanner-uri>
        <acceptable-responses>
            <score>pass</score>
            <score>scanner__not__applicable</score>
        </acceptable-response>
    </appscan>
    <appscan name"injection-attack">
        <scanner-uri>appstore/scanners/injection-attack</scanner-
uri>
        <acceptable-responses>
            <score>8.0</score>
            <score>scanner__not__applicable</score>
        </acceptable-response>
    </appscan>
    <appscan name"acme-custom-scanner">
        <scanner-uri>http://acme.com/scanners/acme-custom-
scanner</scanner-uri>
        <acceptable-responses>
            <score>pass</score>
        </acceptable-responses>
    </appscan>
    <appscan name"ScanCorp-custom-scanner">
        <scanner-uri>http://scancorp.com/scanners/scancorp-
custom-scanner</scanner-uri>
        <url-params>
            <param order="1">
                <name>onBehalfOf</name>
                <value>acme</value>
            </param>
            <param order="2">
                <name>credentialToken</name>
                <value>HTW45ACME88</value>
            </param>
        </url-params>
        <method-of-payment>
            <agreement-no>TTXXYZ5</agreement-no>
            <paypal>234GG1HT5</paypal>
        </method-of-payment>
        <acceptable-responses>
            <score>pass</score>
        </acceptable-response>
    </appscan>
</acme-lab-policy>
</xml>
```

In the sample policy above for ACME Company, four scanners have been established: secure-communication, injection-attack, acme-custom-scanner, and ScanCorp-custom-scanner. Secure-communication and injection-attack are both application scanners provided by an application store (e.g., the host system computer 102), as determined by the storage location information or URI in the policy above. The acme-custom-scanner is an application scanner that has been created by the client system 108 (e.g., via the scan logic and report generator 114) and is stored at the client system 108, as determined by the location information in the policy. The ScanCorp-custom-scanner is an application scanner that has been developed by a third party organization, and is stored at the third party organization site, as determined by the location information in the policy.

Further, as shown in the example policy above for ACME (e.g., one of client systems 108), the client system 108 has defined what is an acceptable scan result for each of the scanners. In particular, the acceptable scan result for secure-communication is 'pass,' while the acceptable scan result for injection-attack is '8.0.' Also, as shown in the example policy, the client system 108 provides payment information for facilitating fee-based application scanning provided by third-party entities, such as ScanCorp.

Figure 3:
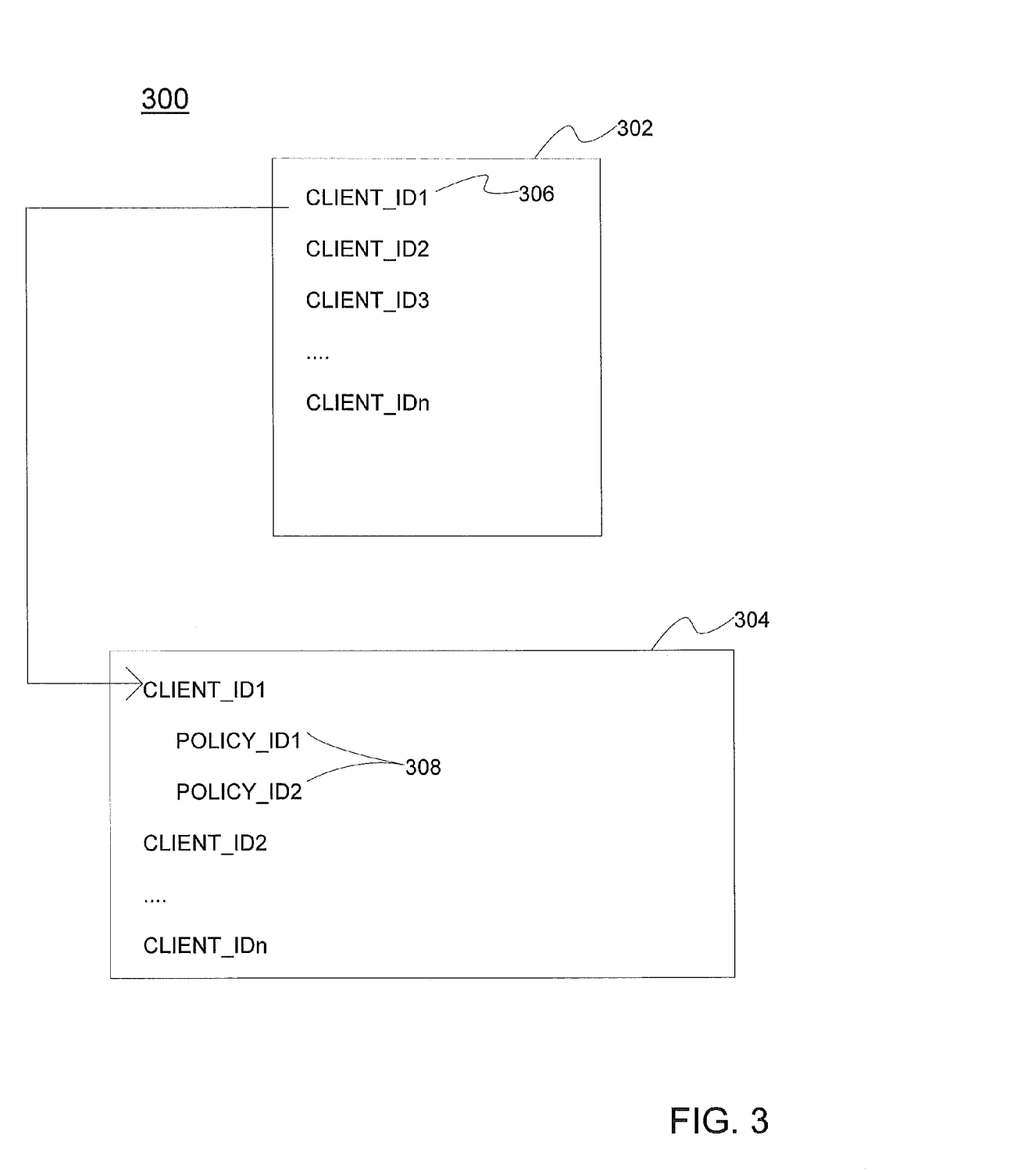
FIG. 3 depicts client and policy tables configured for use by the policy-driven scanning of mobile applications according to an embodiment.

Turning back to FIG. 2, once the policy has been established for the client system 108, the policy is stored in the storage device 110. Table 302 of FIG. 3 illustrates a sample client identifier 306, CLIENT_ID, which is linked to a table 304 that maps the client to its policies (POLICY_ID1 and POLICY_ID2), collectively referred to as policies 308.

At step 206, mobile applications in the storage device 110 are scanned via the scan logic and report generator 114 using the client-defined policy of the client system 108. It will be understood that the scanning may occur at times other than when the policy is first established for a client system 108. For example, the scanning for a particular mobile application may be performed at the time a mobile device (e.g., one of mobile devices 104) associated with a client system 108 has requested download of the mobile application. In a further embodiment, the scanning process for a mobile application is performed each time the mobile application is modified (e.g., updated to a new version).

Figure 4:
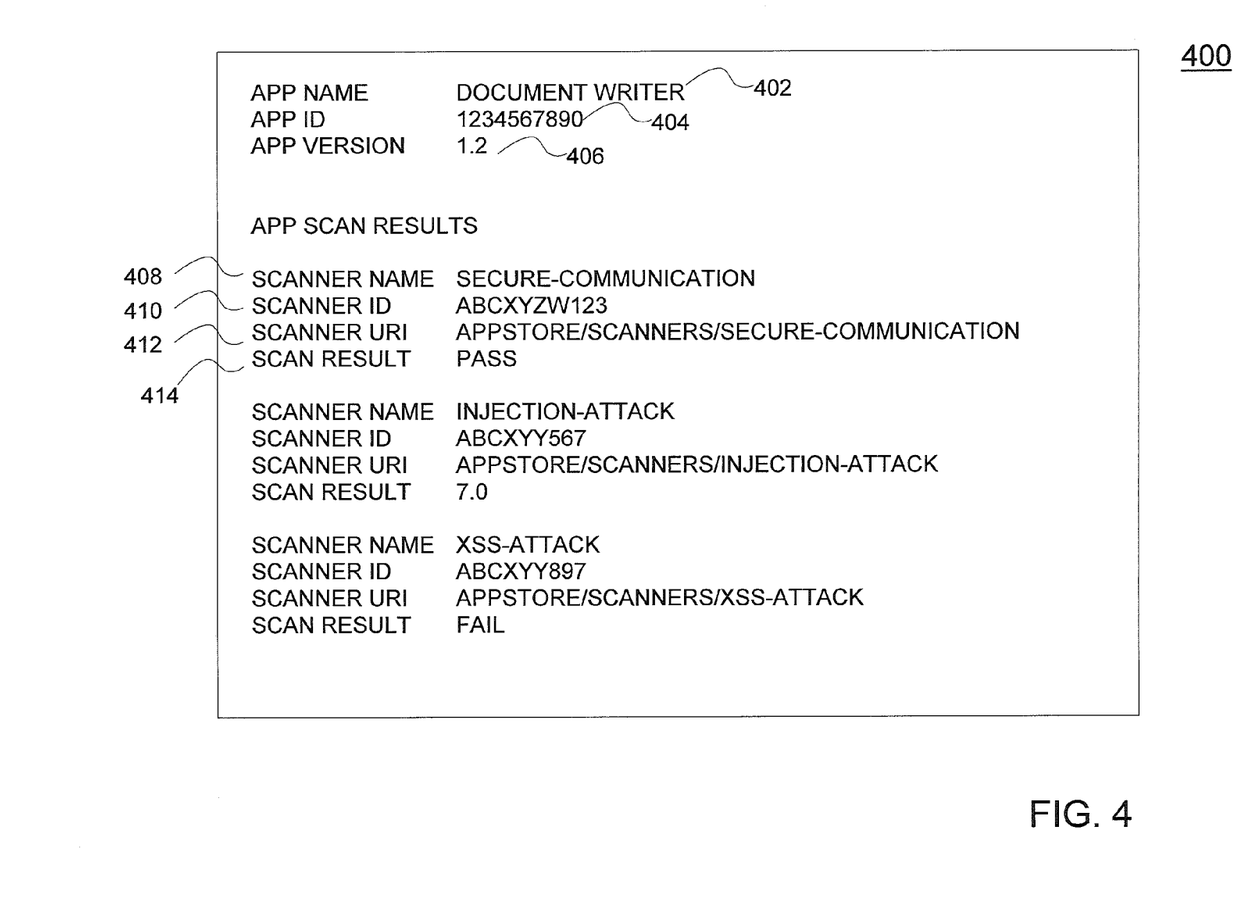
FIG. 4 depicts a report with sample scan results for a mobile application according to an embodiment.

Regardless of when the scanning process is performed, results of the scanning are stored in a record that is associated with the mobile application. For example, as shown in FIG. 4, a record 400 illustrates three sample scan results for a mobile application "Document Writer." As shown in FIG. 4, the record 400 may include mobile application information, such as application name 402, application identification 404, and application version 406. The application scan results stored in the record 400 may include application scan name 408, application scan identifier 410, the storage location of the application scan 412, and the scan result 414. As indicated above, when a new version of the mobile application becomes available, it is rescanned and the results may be stored in a new record.

At step 208, the scan logic and report generator 114 controls access to requested mobile applications based on the results of the scanning performed in step 206. The host system computer 102 may permit or deny download of the mobile application by the mobile device 104 based on the scan results, or may place restrictions on the features available from the mobile application (e.g., view only capabilities).

In one embodiment, the client system 108 may further refine its policies by establishing scan definitions based on the end user of the mobile device 104. For example, separate policies may be defined for executive-level users and rank-and-file users whereby executive-level users are provided greater flexibility in application downloads. The governance of these policies may be implemented by establishing and maintaining user or device credentials that are mapped to corresponding entities (via client systems 108).

In another embodiment, the scan logic and report generator 114 may be configured to provide client systems 108 with reports containing transactions conducted by associated end user devices with respect to the app store of host system computer 102. For example, the scan logic and report generator 114 may track the requests for downloads in terms of which mobile applications are most frequently requested, as well as the requests for downloads that have been declined in response to scan results. In this manner, the client system 108 may evaluate these activities over time and reassess the need and effectiveness of its policies based on the transaction information.

Technical effects include policy-driven application scanning services, which provide the ability for entities, such as organizations or enterprises to establish customized policies for use in scanning various mobile applications, such that end users associated with these entities are able to download or access only those mobile applications that comply with the policies subject to the scanning. The customized policies are converted to application code, which is used to scan selected mobile applications, and the results of the scan are provided in a scan report.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A system, comprising:
   a computer processor; and
   logic executable by the computer processor, the logic configured to implement a method, the method including:
   implementing a registration process for a client system, the registration process including receiving a mobile device identifier for a mobile device from the client system and storing the mobile device identifier in a record created for the client system;
   providing the client system, once registered, with an interface for creating a policy, the policy defined by rules configured for implementation by a scanner and a compliance definition indicative of a threshold acceptability value for output of the implementation of the scanner on a mobile application, and the interface comprises fields for receiving the rules and the compliance definition;
   receiving the policy defined by the client system;
   executing the scanner for the mobile application;
   identifying an association between a mobile device and the client system, the identifying performed by searching the record for the mobile identifier; and
   controlling access to the mobile application by the mobile device based on results of executing the scanner using the compliance definition.

2. The system of claim 1, further comprising logic configured for:
   persisting the policy and the results of the executing the scanner; and
   associating the policy and the results of the executing the scanner with the client system.

3. The system of claim 1, wherein the policy includes:
   a name of the scanner; and
   a storage location of the scanner.

4. The system of claim 1, wherein the controlling access to the mobile application includes preventing download of the mobile application from the computer processor to the mobile device.

5. The system of claim 1, wherein the controlling access to the mobile application includes permitting download of selected features of the mobile application from the computer processor to the mobile device, the selected features comprising a subset of all features of the mobile application.

6. The system of claim 1, wherein the executing the scanner for a mobile application is implemented upon receiving a request by the mobile device to download the mobile application.

7. The system of claim 1, further comprising logic configured for:
   receiving another policy from the client system, the other policy including a selection by the client system of a scanner originating from a third-party entity and a compliance definition defined by the client system, the compliance definition defined by the client system indicative of a threshold acceptability value for output of the implementation of the scanner originating from the third-party entity on another mobile application;
   wherein the other policy further includes a fee charged by the third-party entity for use of the scanner originating from the third-party entity.

8. The system of claim 1, further comprising logic configured for:
   tracking transactions conducted by the mobile device at the computer processor, the transactions including requests for downloading mobile applications;
   generating a report of the transactions; and
   transmitting the report to the client system.

9. The system of claim 1, further comprising logic configured for:
   generating a report including the results of the executing the scanner; and
   transmitting the results of the executing the scanner to the client system.

* * * * *